US011095698B2

(12) United States Patent
Ravich et al.

(10) Patent No.: US 11,095,698 B2
(45) Date of Patent: Aug. 17, 2021

(54) TECHNIQUES FOR PROCESSING MANAGEMENT MESSAGES USING MULTIPLE STREAMS

(71) Applicant: EMC IP Holding Company LLC, Hopkinton, MA (US)

(72) Inventors: Leonid Ravich, Raanana (IL); Eyal Ben Ner, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/519,261

(22) Filed: Jul. 23, 2019

(65) Prior Publication Data
US 2021/0029179 A1    Jan. 28, 2021

(51) Int. Cl.
*H04L 29/06*   (2006.01)
*H04L 12/28*   (2006.01)

(52) U.S. Cl.
CPC .......... *H04L 65/4069* (2013.01); *H04L 69/16* (2013.01); *H04L 12/2854* (2013.01)

(58) Field of Classification Search
CPC ................ H04L 65/4069; H04L 69/16; H04L 12/2854
See application file for complete search history.

(56) References Cited

U.S. PATENT DOCUMENTS

| | | | | |
|---|---|---|---|---|
| 7,633,971 | B1 * | 12/2009 | Butler | H04L 67/025 370/419 |
| 2010/0180295 | A1 * | 7/2010 | Ratsch | H04N 21/4345 725/34 |
| 2011/0161500 | A1 * | 6/2011 | Yengalasetti | H04L 65/608 709/227 |
| 2018/0027099 | A1 * | 1/2018 | Dajani | H04L 69/165 709/217 |

OTHER PUBLICATIONS

Thomas J. Hacker, et al., "The End-to-End Performance Effects of Parallel TCP Sockets on a Lossy Wide-Area Network," University of Michigan, 2002, IEEE.
Kevin Dooley, auvik, "How to Adjust TCP Window Size to Improve Network Performance," https://www.auvik.com/franklymsp/blog/tcp-window-size/, Apr. 11, 2017.
Wikepedia, "Network socket," https://en.wikipedia.org/wiki/Network_socket.

* cited by examiner

*Primary Examiner* — Rupal Dharia
*Assistant Examiner* — Steven C Nguyen
(74) *Attorney, Agent, or Firm* — Muirhead and Saturnelli, LLC

(57) ABSTRACT

Techniques for processing messages may include: establishing a plurality of streams between a source system and a target system; reserving one or more streams of the plurality of streams, wherein the one or more streams are reserved and used in transmitting only management messages, wherein the one or more streams includes a first stream of the plurality of streams; transmitting a first management message over the first stream from the source system to the target system; and transmitting a first data message over a second of the plurality of streams, wherein the second stream is not included in the one or more streams reserved for use in transmitting only management messages.

14 Claims, 12 Drawing Sheets

TECHNIQUES FOR PROCESSING MANAGEMENT MESSAGES USING MULTIPLE STREAMS

BACKGROUND

Technical Field

This application generally relates to data transmissions and, more particularly, to techniques for transmission of management messages.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing messages comprising: establishing a plurality of streams between a source system and a target system; reserving one or more streams of the plurality of streams, wherein the one or more streams are reserved and used in transmitting only management messages, wherein the one or more streams includes a first stream of the plurality of streams; transmitting a first management message over the first stream from the source system to the target system; and transmitting a first data message over a second of the plurality of streams, is not included in the one or more streams reserved for use in transmitting only management messages. The second stream may be used in transmitting only non-management messages. The non-management messages may include data messages.

In at least one embodiment, M is at least one and denotes a number of streams reserved by said reserving one or more streams, and wherein reserving may include: reserving M sockets on the source system, wherein the M sockets on the source system are reserved for use only with management messages; and reserving M sockets on the target system, wherein the M sockets on the target system are reserved for use only with management messages, wherein the first stream includes a first socket of the M sockets reserved on the source system and second socket of the M sockets reserved on the target system. The first management message may be sent from the first socket reserved on the source system to the second socket reserved on the target system. Processing may include sending a response to the first management message from the target system to the source system. The response to first management message may be sent to the first socket reserved on the source system that sent the first management message. M may be at least 2 and the response to the first management message may be sent to a third of the M sockets on the source system, wherein the first socket reserved on the source system reserved is different from the third socket reserved on the source system. M may be at least 2 and each of the M sockets on the source system may be associated with a different one of M kernel queues on the source system.

In at least one embodiment, processing may include: placing each of a plurality of management messages from a management message queue in user space of the source system into a different one of the M kernel queues of the source system, wherein the plurality of management messages includes the first management message; and transmitting each of the plurality of management messages in the different one of the M kernel queues from the source system to the target system over a different one of the M streams reserved for management messages, wherein the different one of the M streams includes a corresponding one of the M sockets of the source system associated with the different one of the M kernel queues of the source system, and wherein the different one of the M streams includes one of the M sockets reserved on the target system. The source system may be a source data storage system and the target system may be a target data storage system. The first management message and the first data message may be transmitted from the source data storage system to the target data storage system in connection with performing a replication storage service on the source data storage system. The first management message may be sent over a control or management path including the first stream. The first data message may be sent over a data or I/O path including the second stream. The plurality of streams may be over a wide area network. The plurality of streams may be included in a same established connection in accordance with a transmission control protocol (TCP). Establishing may include: sending first information from the source system to the target system identifying the M sockets of the source system reserved for processing only management messages; and sending second information from the target system to the source system identifying the M sockets of the target system reserved for processing only management messages.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1A:
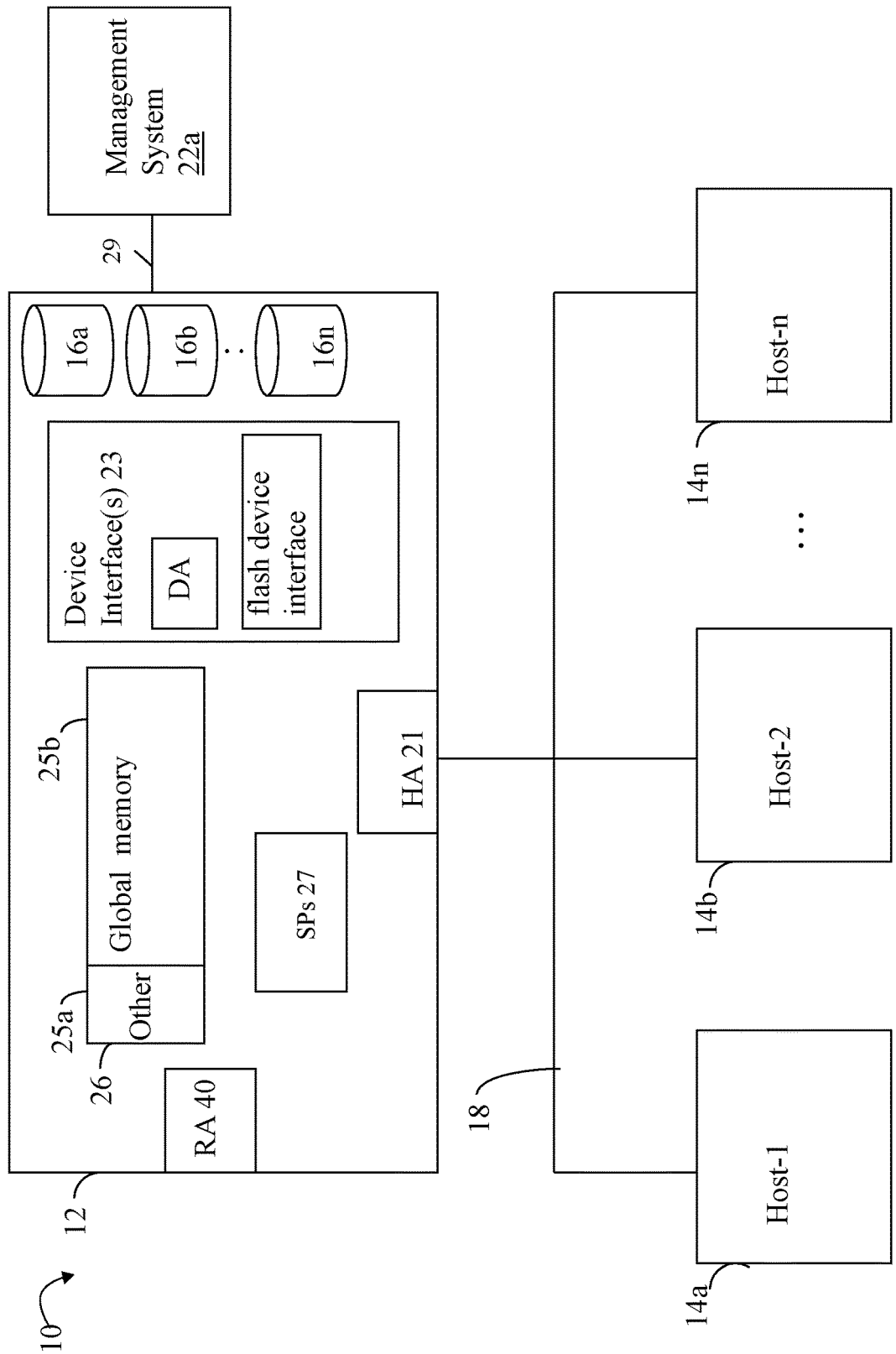
FIGS. 1A and 1B are examples of components that may be included in a system in accordance with techniques described herein.

Referring to the FIG. 1A, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1A, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1A is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1A may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1A, the control or management commands may be issued from data storage management software executing on management system 22*a* to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data or I/O path and the control or management path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1A, a data storage system may have a separate physical connection 29 from a management system 22*a* to the data storage system 12 being managed whereby control commands may be issued over such a physical connection 29. However, it may be that user I/O commands are never issued over such a physical connection 29 provided solely for purposes of connecting the management system to the data storage system. In any case, the data or I/O path and the control or management path each define two separate logical flow paths.

In following paragraphs, techniques are described that may generally be used in connection with transmission of management commands or messages over the management or control path where such management commands or messages are sent of a network. In at least one embodiment, the data messages may be those transmitted over the data or I/O path which are also sent over a network.

For example, the network may be a wide area network. Generally, the management commands or messages may be sent between two systems. For example with reference back to FIG. 1A, the management messages may be transmitted over a WAN (wide area network) 29 between a management system 22*a* and a data storage system 12 in a use case where the management system 22*a* includes a management application and a user may issue management commands to an application executing on the management system 22*a* to perform different management operations such as discussed elsewhere herein.

Figure 1B:
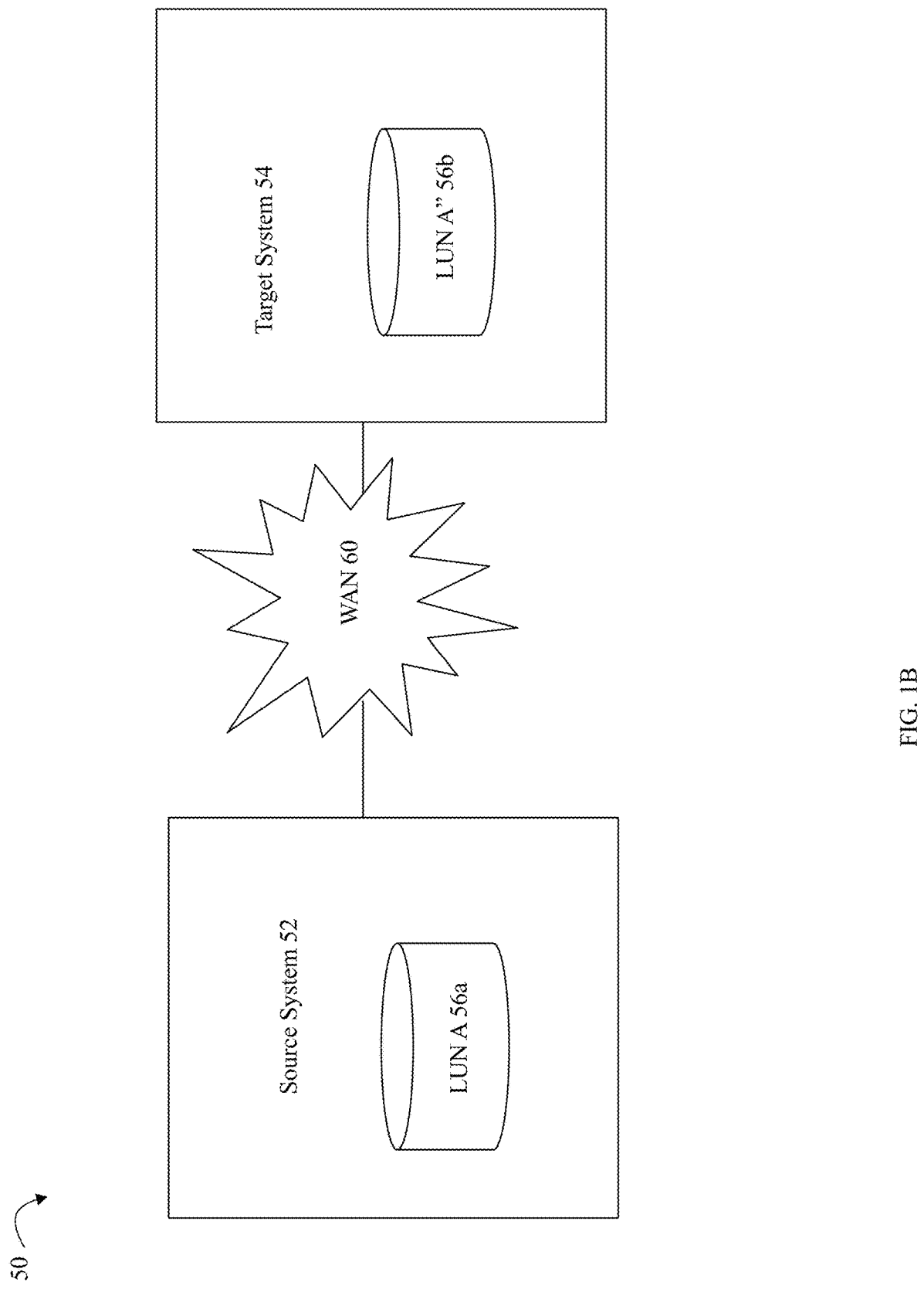

As another example 50 and with reference to FIG. 1B, the management messages may be transmitted over a WAN 60 between two data storage systems 52, 54 such as in connection with performing replication of data between the two data storage systems. For example, a replication service on the system 52 may perform replication processing for LUN A 56*a* of the source system 52 where the replication service transmits management commands or messages as over a WAN 60 to a target system 54. The replication service of the system 52 may perform processing to maintain a mirrored physical copy of the LUN A 56*a* of the system 52*a* on the target system 54. LUN A" 56*b* denotes the mirrored copy of the LUN A 56*a*. The replication facility may perform such processing in an ongoing continuous manner as writes are applied over time to the source LUN A 56*a*. The replication facility may send data messages as well as management messages over the WAN 60 in connection with performing such replication.

In following paragraphs, reference may be made to a particular example or use case for illustration of the techniques herein. However, more generally, the techniques herein may be used in connection with any 2 systems for any purposes where the 2 systems send management messages therebetween, such as over a network such as a WAN.

In at least one embodiment, the management and data messages may be sent over a WAN in accordance with TCP/IP (Transmission Control Protocol/Internet Protocol). The IP protocol deals only with packets, and TCP enables two system to establish a connection and exchange streams of data. TCP guarantees delivery of data and also guarantees that packets will be delivered in the same order in which they were sent. TCP provides reliable, stream-oriented connections. With TCP/IP data is organized into streams of bytes. TCP/IP provides for reliable delivery. Sequence numbers are used to coordinate which data has been transmitted and received. TCP will arrange for retransmission if it determines that data has been lost or dropped (e.g., not received for some reason by its destination or receiver).

Generally, a TCP stream is between two sockets each of which denotes a different endpoint of the transmission stream. As known in the art, a TCP stream may exist within an established TCP connection between the two sockets. A TCP connection may be established such as using a TCP handshake including messages exchanged between an initiator and server, target or destination. For a stateful protocol like TCP, a connection is identified by a 4-tuple consisting of source and destination ports and source and destination IP addresses. Within a single TCP/IP connection, there may generally be one or more sockets and thus one or more streams associated with a single TCP/IP connection. The handshake may also be described as a negotiation per of parameters and information exchanged between the two systems as part of establishing the TCP/IP connection therebetween.

In at least one embodiment, a TCP connection may be established by a series of messages exchanged between an initiator and a server or destination. In at least one embodiment, 3 messages may be exchange to establish a TCP connection. The initiator or source may send a TCP Synchronize (synch) packet to the target or destination. The target receives the initiator's synch packet and sends a first acknowledgement to the initiator. The initiator receives the first acknowledgement. The initiator then sends a second acknowledge to the target. Various information known in the art in accordance with TCP/IP may be included in the messages exchanged between the initiator and the target as part of the negotiation handshake to establish the TCP connection. Such information may include, for example, the source port number, the source IP address, the target port number, the target IP address. Within a single TCP/IP connection a TCP/IP stream may also be established between a first socket of the source and a second socket of the target. Each socket may be identified uniquely using a combination of the IP address of a connection and a TCP port number.

When the communication between the source and target systems ends, another 3-way communication is performed to tear down the TCP connection. This setup and teardown of a TCP connection is part of what qualifies TCP a reliable protocol. TCP also acknowledges that data is successfully received and guarantees the data is reassembled in the correct order.

A WAN may generally have random packet loss or drops resulting in increased message latency and reduced throughput. Generally, the higher the packet loss over a WAN using TCP/IP, the higher the latency and more reduced the throughput, for example, due to the needed retransmission and processing associated with the dropped or lost packets.

Figure 2:
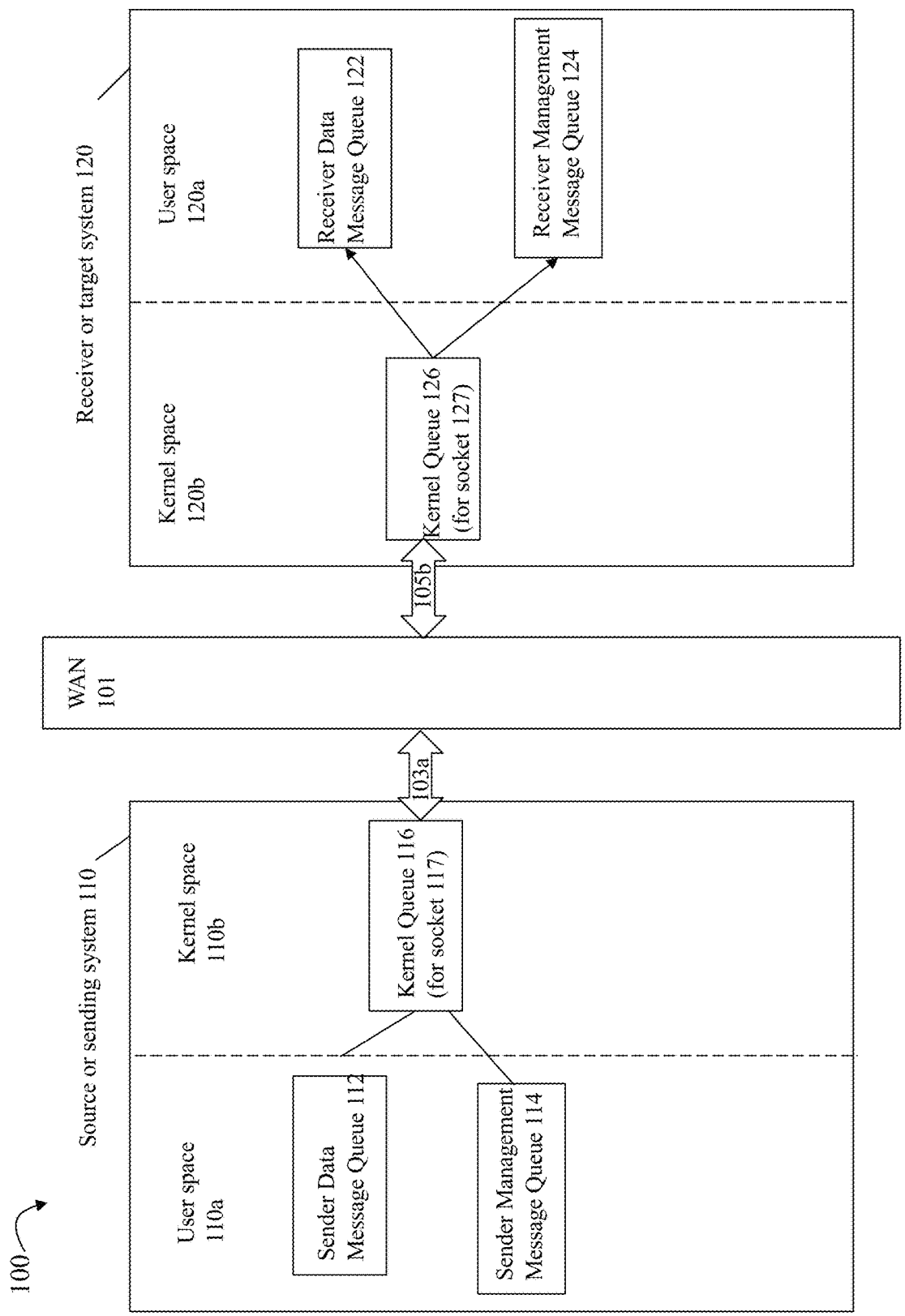
FIGS. 2 and 3 are examples of configuration of components without dedicated or reserved TCP streams and without reserved sockets and associated management kernel queues.

Reference is made to the FIG. 2 illustrating use of a single stream for sending both management and data messages. In the example 100, both data and management commands or messages may be transmitted, over WAN 101, using a single TCP connection with a single stream between a source or sending system 110 a receiver or destination system 120. The systems 110 and 120 may be executing an operating system, such as a Unix-based operating system having a user mode or space and a kernel mode or space. Generally, the user mode or space may denote an execution mode that is non-privileged where code executes at a lower priority and privilege than code executing in the kernel mode or space. In this example 100, a single TCP stream may be used to transmit both data and management messages collectively between the systems 110 and 120. In following paragraphs and example, the term message may be used interchangeably with packet based on the assumption that a single message is a single packet. However, more generally, a single message may correspond to one or more packets.

The sending system 110 includes user space 110a and kernel space 110b. The user space 110a may include sender data message queue 112 and sender management message queue 114. The sender data message queue 112 includes data packets or messages including user data. The sender management message queue 114 includes management packets or messages. The kernel space 110b may include a single kernel queue 116 into which both management and data messages flow from, respectively, the queues 114 and 112. In this example, The kernel queue 116 may be associated with packets of messages sent over a single TCP stream associated with a single TCP socket of the source system 110. Generally, for each TCP stream, the kernel 110b of the source system 110 may allocate a single kernel queue for transmissions sent and received over the stream. Kernel queue 116 denotes the single kernel-level queue used for transmitting messages or packets over the WAN 101 over the single stream for a single TCP socket 117. Thus, each TCP socket may have its own dedicated kernel queue, such as 116. Element 103a denotes the communication path between the WAN 101 and the TCP socket 117 and associated kernel queue 116 of the source system 110.

Data messages or packets sent, such as part of the I/O path in connection with writes of write data in connection replication, may be placed on the user space queue 112 which then flow to the kernel queue 116 of the socket 117 and associated single stream for transmission over the WAN 101 to the receiver or target system 120. Queue 112 may only include data messages or packets and does not include any command messages or packets.

Management messages or packets sent, such as in connection with management commands issued for replication, may be placed on the user space queue 114 which then flow to the kernel queue 116 of the socket 117 and associated single stream for transmission over the WAN 101 to the receiver or target system 120. The queue 114 may only include command messages or packets and does not include any data messages or packets.

The receiver or target system 120 includes user space 120a and kernel space 120b. The user space 120a may include sender data message queue 122 and sender management message queue 124. The sender data message queue 122 includes data packets or messages including user data. The sender management message queue 124 includes management packets or messages. The kernel space 120a may include a single kernel queue 126 into which both management and data messages flow from, respectively, the queues 124 and 122. In this example, the kernel queue 126 may be associated with packets of messages sent over a single TCP stream associated with a single TCP socket of the system 120. Generally, for each TCP stream, the kernel 120b of the target system 120 may allocate a single kernel queue for transmissions sent and received over the stream. Kernel queue 126 denotes the single kernel-level queue used for transmitting messages or packets over the WAN 101 over the single stream for a single TCP socket 127. Thus, each TCP socket may have its own dedicated kernel queue, such as 126. Element 105a denotes the communication path between the WAN 101 and the TCP socket 127 and associated kernel queue 126 of the target system 120.

Data messages or packets sent may be placed on the user space queue 122 which then flow to the kernel queue 126 of the socket 127 and associated single stream for transmission over the WAN 101 to source system 110. The queue 122 may only include data messages or packets and does not include any command messages or packets. Such data messages or packets in 122 may include responses or replies to data messages transmitted from the system 110.

Management messages or packets sent, such as in connection with management commands issued for replication, may be placed on the user space queue 124 which then flow to the kernel queue 126 of the socket 127 and associated single stream for transmission over the WAN 101 to the source system 110. Queue 124 may only include command messages or packets and does not include any data messages or packets. Such management messages or packets in 124 may include responses or replies to management messages transmitted from the system 110.

In at least one embodiment, a data message may have an associated packet size that is relatively much larger than the packet size of management messages. For example, a data message may have a packet size of 1 MB (megabyte) or maximum size of 1 MB. A management message may have a packet size of 1 KB (kilobyte) or maximum size of 1 KB.

In at least one embodiment, such as in connection with replication, management messages or packets may be characterized as latency sensitive and the data messages or packets may not be latency sensitive. For example consider an application of the source system that sends a management message to the target system in connection with issuing a management command. Thus, the application and possibly user using the application may be performing an operation and waiting in real time for the operation of the management command to be performed and for a response to be sent to the management command to be transmitted from the target to the source system. Thus, the application may experience a timeout if such a response is not received by the source system within an expected time period.

Within user space 110a, 120a, an application may have control and may prioritize messages or packets placed in the user-space queues (e.g., 112, 114, 122 and 124). However, the application executing in user space may not have control over elements in kernel space, such as the queues 116 and 126.

The example 100 of FIG. 2 illustrates an arrangement which does not utilize the techniques herein with a single TCP stream used for transmission of both data and management packets. In TCP, one or more data packets may be sent from the source system 110 to the target system 120. The target system validates the received data (e.g., such as using a checksum for each packet) and then sends an acknowledgement to the source system that all data packets were received correctly. If all the data is not correctly received by the target system, the source system retransmits the unreceived packets and/or the packets that were determined as invalid by the target system. The source system temporarily saves the data packets transmitted in a buffer in case it needs to retransmit such data. Receiving the acknowledgement means the source system can flush the buffer. Window size denotes the number of bytes that can be transmitted from a sending system before such an acknowledgement must be received by the receiving system.

Generally, $$\text{Latency} = \frac{\text{Window size}}{\text{Bandwidth}} \quad \text{EQUATION 1}$$

Where
window size is as described above; and
bandwidth is the bandwidth of the TCP connection.

In such an embodiment as illustrated in FIG. 2, the window size may be greater than or equal to the maximum message size, which in this example is the maximum size of a data packet. In an embodiment as illustrated in FIG. 2, latency may be expressed as follows in EQUATION 2:

$$\text{Latency} \geq \frac{\text{maximum size of data packet}}{\text{bandwidth}} \quad \text{EQUATION 2}$$

In connection with the arrangement of FIG. 2 and EQUATION 2, the maximum size of data packet is generally the maximum size of a message or packet in the queue, such as 1 MB as noted above. The bandwidth in EQUATION 2 is the bandwidth of the TCP connection, as described in connection with EQUATION 1 (assuming all streams are over the same TCP connection). EQUATION 2 indicates that, in a worst case scenario, the latency associated with a management message may be expected to be greater than or equal to the right hand side of EQUATION 2.

Such an expected latency experienced with respect to the arrangement of FIG. 2 may be unacceptable for management messages.

Figure 3:
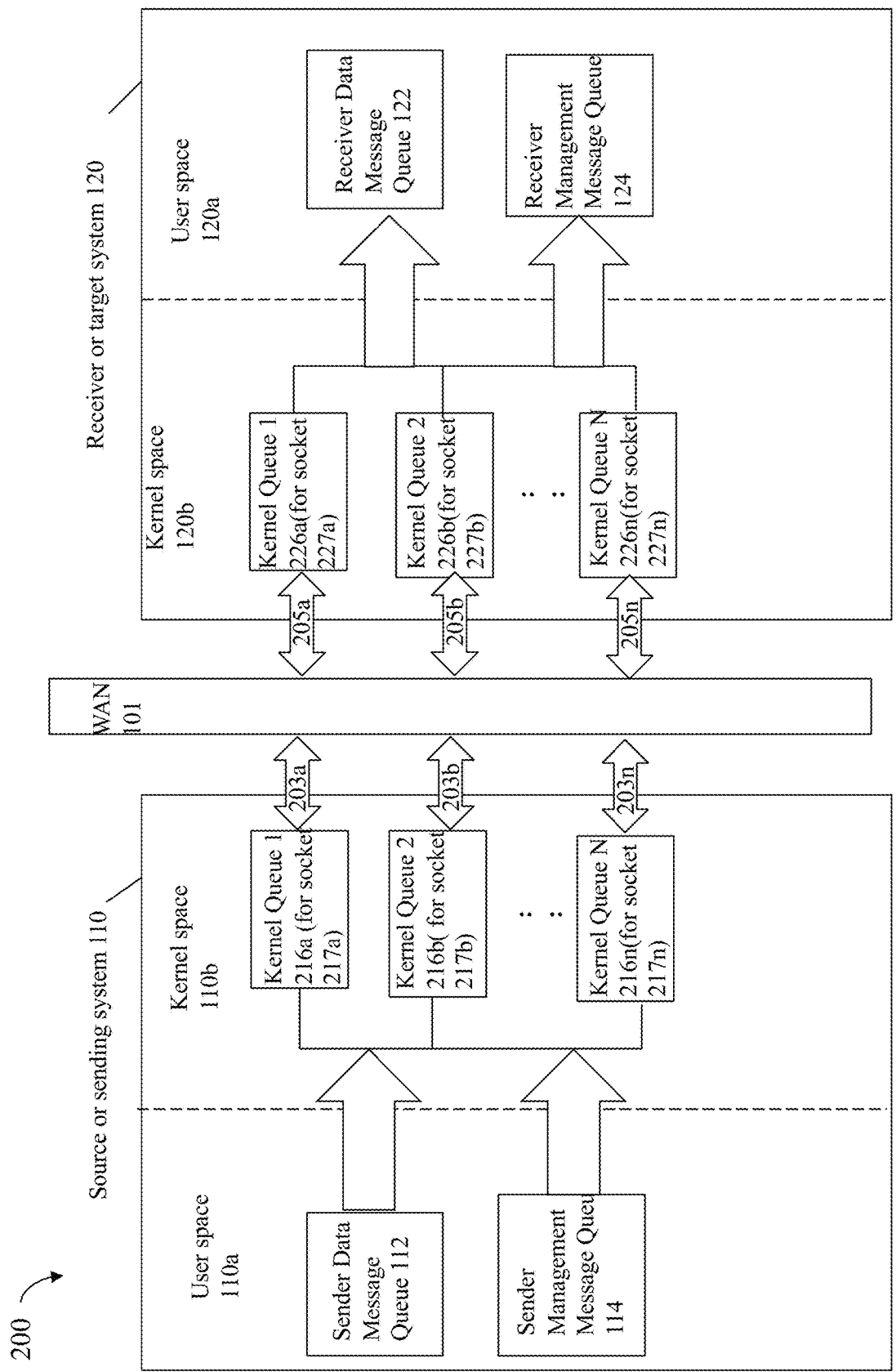

One possibility to reduce or control the latency associated with management messages may be to further utilize multiple TCP streams in an arrangement such as illustrated in FIG. 3. However, depending on the arrangement of the various queues, using multiple TCP streams may actually further increase the possible latency associated with management messages.

The source and target systems in the example 200 of FIG. 3 are similar to those as described in connection with FIG. 2 with the difference that there are multiple streams, N streams, used to transmit data and management messages or packets between the systems 110 and 120.

The source system 110 includes N kernel queues 216a-n each associated respectively, with sockets 217a-n). Both user space queues 112 and 114 provide input packets to any/all of the kernel space queues 216a-n and associated sockets 217a-n. Elements 203a-n denote, respectively, the communication paths between the WAN 101 and the sockets 217a-n (and associated kernel space queues 216a-n). Thus, a management message or data message may be placed on any of the kernel space queues 216a-n for outgoing transmission to the target system 120 over any of the "n" streams using any of sockets 217a-n. Each one of the N kernel space queues 216a-n is associated with a different one of the "N" sockets (e.g. generally a 1:1 association). For example kernel space queue 216a is associated with 217a whereby messages on the kernel space queue 216a are transmitted over the associated socket 217a.

The target system 120 includes N kernel queues 226a-n each associated respectively, with sockets 227a-n). Both user space queues 122 and 124 provide input packets to any/all of the kernel space queues 226a-n and associated sockets 227a-n. Elements 203a-n denote, respectively, the communication paths between the WAN 101 and the sockets 227a-n (and associated kernel space queues 226a-n). Elements 205a-n denote, respectively, the communication paths between the WAN 101 and the sockets 227a-n (and associated kernel space queues 226a-n). Thus, a management message or data message may be placed on any of the kernel space queues 226a-n for outgoing transmission to the source system 110 over any of the "n" streams using any of sockets 227a-n. Each one of the N kernel space queues 226a-n is associated with a different one of the "N" sockets (e.g. generally a 1:1 association). For example kernel space queue 226a is associated with 227a whereby messages on the kernel space queue 226a are transmitted over the associated socket 227a.

Use of such multiple TCP streams in an arrangement as in FIG. 3 may increase overall total performance for a combination of all messages or packets transmitted over all streams (e.g., all kernel queues collectively). However, such additional kernel queue and streams increases the total number of packets or messages collectively in the kernel queues which further increases the possible worst case scenario for management packet or message latency. Thus, adding more TCP streams as in the arrangement of FIG. 3 also further adversely impacts the expected maximum latency possibly experienced for a management packet or message and may be expressed as in EQUATION 3:

$$\text{Latency} \geq \frac{(\text{maximum size of data packet}) * (\text{number of streams})}{\text{bandwidth}} \quad \text{EQUATION 3}$$

where:

the maximum size of data packet may be as noted above in connection with EQUATION 2;

number of streams is "N", denoting the number of streams, also the number of sockets and the number of kernel queues; and bandwidth is as described above denoting the bandwidth across all streams such as may be associated with a single TCP connection.

Thus, message latency is a function of the number of TCP streams, such as expressed using EQUATIONS 2 and 3 above.

What will now be described are various embodiments in accordance with the techniques herein that overcome the increased latency that may be expected in connection with management messages in the arrangements of FIG. 2 or 3. The techniques herein have one or more dedicated TCP streams, and thus dedicated sockets and kernel queues, for management packets or messages and associated responses.

For example, in at least one embodiment in which N streams are used as described in connection with FIG. 3, one TCP stream may be used as a dedicated stream for sending management messages. In such an embodiment, a selected first socket of the source system 110 and a selected second socket of the target system 120 may be reserved or dedicated for use in transmitting management packets or messages. In such an embodiment, the response to the management message may also be transmitted over the dedicated management stream from selected the second socket of the target system to the selected first socket of the source system.

For example, in at least one embodiment in which N streams are used as described in connection with FIG. 3, multiple TCP streams, or generally M streams, M>1, may be used as dedicated streams for sending management messages. In such an embodiment, a selected first set of multiple sockets of the source system 110 and a selected second set of multiple sockets of the target system 120 may be reserved or dedicated for use in transmitting management packets or messages. In such an embodiment, the response or reply to the management message may also be transmitted over one of the dedicated management streams from one socket of the second set of sockets of the target system to another socket from the first set of sockets of the source system. In at least one embodiment, the response or reply message to a management packet or message may be transmitted by the target system to the same socket of the source system that sent to the management packet or message. As a variation, the response or reply message to a management packet or message may be transmitted by the target system to the any of the M reserved sockets of the source system.

The foregoing and other aspects of the techniques herein are described in more detail in following paragraphs.

Figure 4:
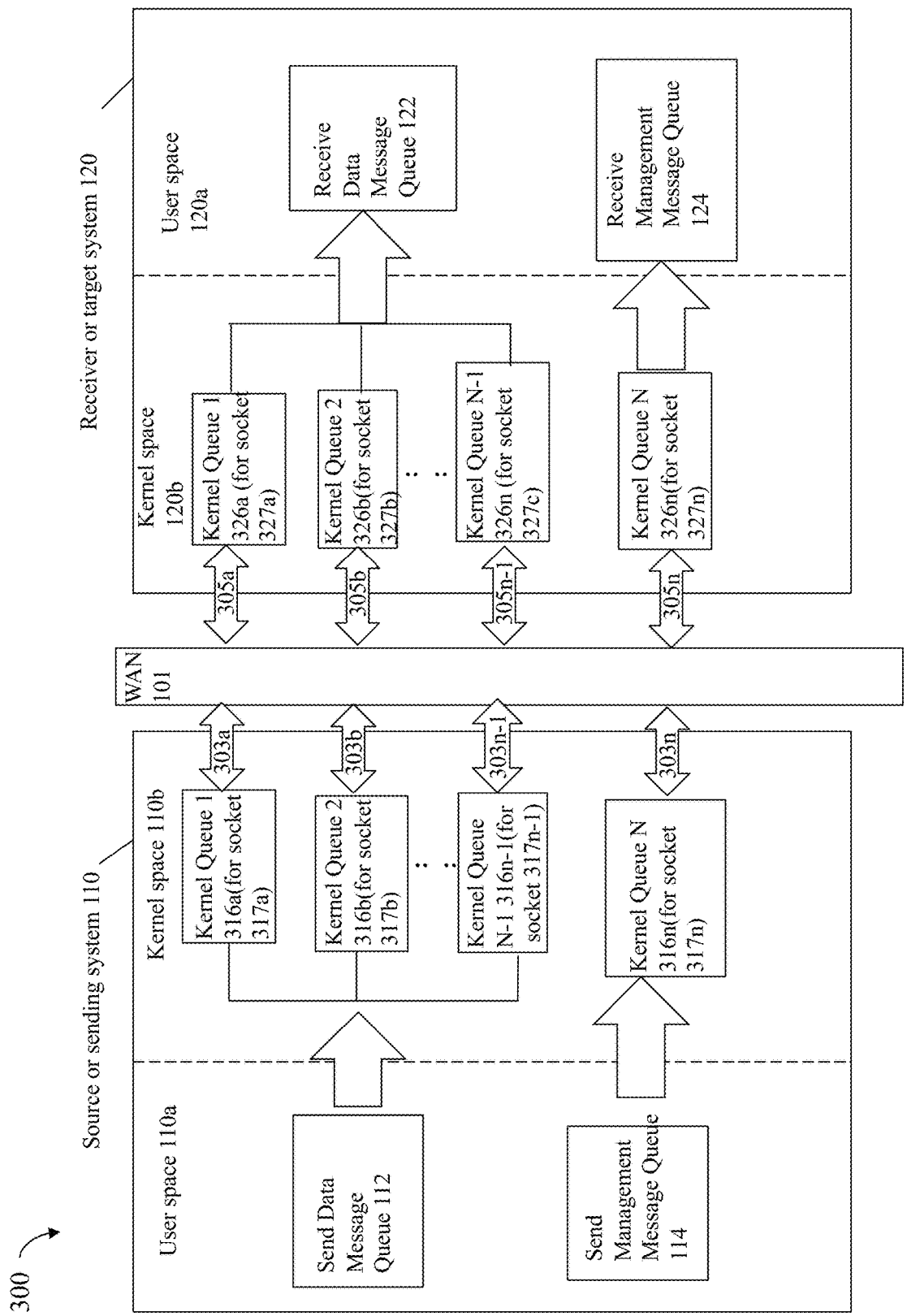
FIGS. 4, 5, 8 and 9 are examples of configuration of components with dedicated or reserved TCP streams and with reserved sockets and associated management kernel queues in embodiments in accordance with the techniques herein.

Referring to FIG. 4, shown is an example of an embodiment in accordance with the techniques herein. The example 300 includes components such as illustrated in FIG. 3 with the difference that one stream is reserved or dedicated for use with transmitting management messages or packets. Thus, in more generalized terms, FIG. 4 illustrates the configuration or arrangement where M of the N streams are reserved and M=1.

On the source system 110, socket 317*n* and thus associated kernel queue 316*n* are reserved or dedicated for use with transmitting management messages or packets of the queue 114 to the target system 120. Elements 303*a*-303*n* denote communication paths between the WAN 101 and, respectively, kernel queues 316*a-n* (and associated sockets 317*a-n*). On the target system 120, socket 327*n* and thus associated kernel queue 327*n*, are reserved or dedicated for use with transmitting management messages or packets of the queue 124 to the source system 110. The socket 327*n* and thus associated kernel queue 326*n* are reserved or dedicated for use with transmitting responses or replies to the management messages or packets of the queue 114 on the source system 110 that are received at the socket 327*n*. Elements 305*a*-305*n* denote communication paths between the WAN 101 and, respectively, kernel queues 326*a-n* (and associated sockets 327*a-n*). Thus, for example, management messages from kernel queue N 316*n* are transmitted from socket 317*n* to WAN 101 over 303*n*, and then from WAN 101 over 305*n* to the socket 317*n* of the target system.

In the example 300, there is a single dedicated or reserved stream between sockets 317*n* of source system 110 and socket 327*n* of the target system 120 for use in transmitting management messages and responses.

In such an embodiment using the arrangement of FIG. 4, the worst case scenario for expected latency for management messages transmitted from the source to the target system may be expressed as:

$$\text{Latency} \geq \frac{(\text{management message size})}{\text{bandwidth}} \quad \text{EQUATION 4}$$

where management message size denote the maximum size of a management message which, for example, may be 1 KB; and bandwidth is as described above with respect to bandwidth of all N streams.

EQUATION 4 may denote a particular case where M=1. EQUATION 4 may be generalized to apply to arrangements in which there are M reserved or dedicated streams for management messages or packets as in EQUATION 5.

$$\text{Latency} \geq \frac{(\text{management message size}) * M}{\text{bandwidth}} \quad \text{EQUATION 5}$$

where management message size and bandwidth are as described in connection with EQUATION 4; and M, as described above, denotes the number of reserved or dedicated streams for use with transmission of management messages or packets and also for replying or responding to such messages.

In connection with EQUATION 5, it should be noted a simplifying assumption may be made in that the operating system transmits management messages from the multiple outgoing kernel queues of the source system in a round robin or fair manner (e.g., uniformly).

Additionally, another assumption may be that a management message occurrence may be rather rare or small in comparison to the number of data messages and that there is 1 management message in each of the reserved or dedicated kernel queues processing management messages. In such a case, the latency of a management message may be expressed as in EQUATION 6 below:

$$\text{Latency} \approx \frac{(\text{management message size}) * M}{\text{bandwidth}} \quad \text{EQUATION 6}$$

where;

≈ denotes an approximation or approximately equal to (e.g., within a specified tolerance or error); and all other items of EQUATION 6 are as in EQUATION 5.

Figure 5:
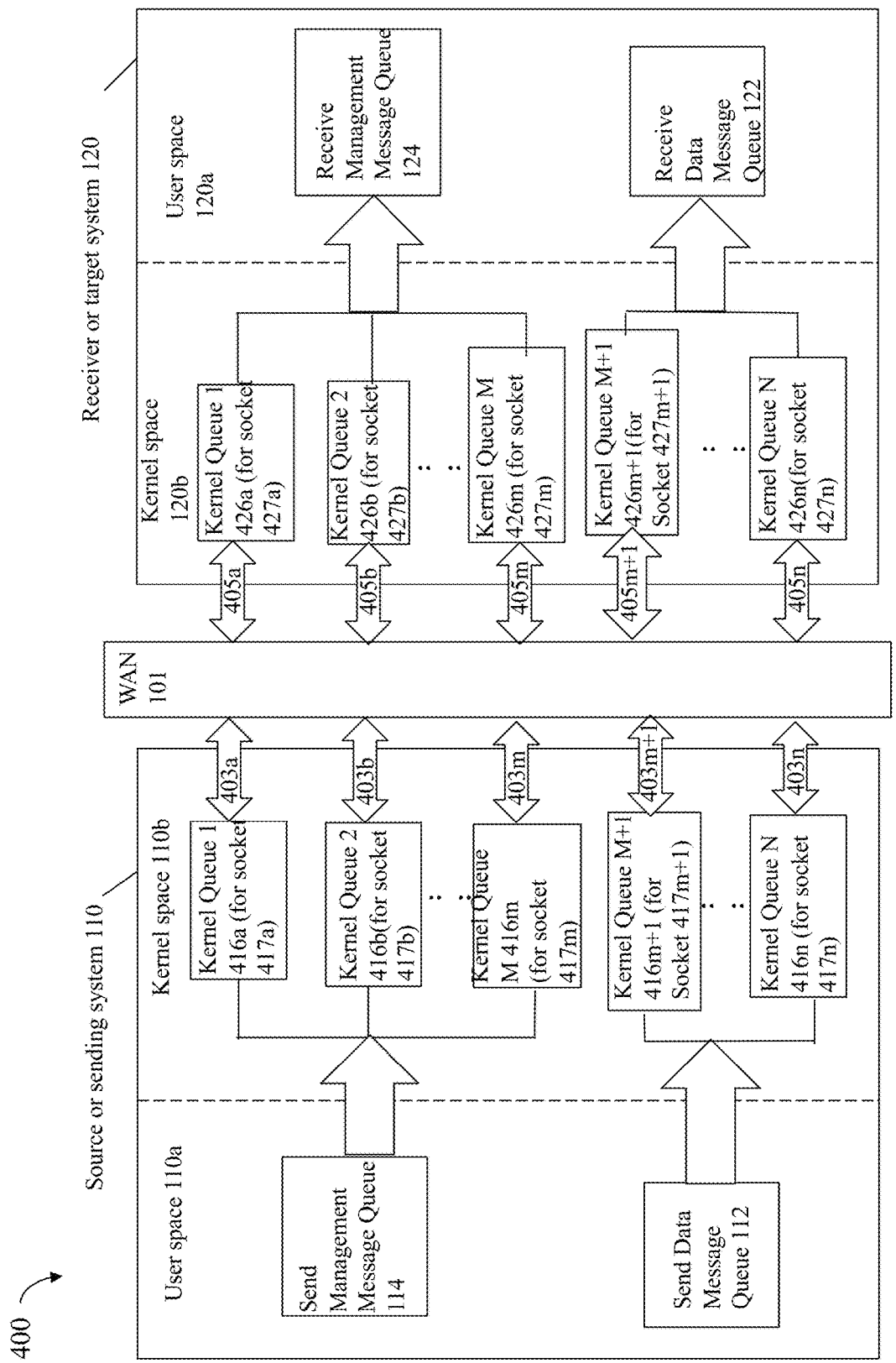

Thus, EQUATION 6 indicates that the right hand size quantity may approximate the worst case latency for a management message in an arrangement in accordance with the techniques herein, such as in FIGS. 4 and 5.

Referring to FIG. 5, shown is an example of another embodiment in accordance with the techniques herein. The example 400 includes components such as illustrated in FIG. 4 with the difference that more than one stream is reserved or dedicated for use with transmitting management messages or packets. Thus, in more generalized terms, FIG. 5 illustrates the configuration or arrangement where M of the N streams are reserved and M>1.

On the source system 110, sockets 417a-m and thus associated kernel queues 416a-m are reserved or dedicated for use with transmitting management messages or packets of the queue 114 to the target system 120. On the source system 110, sockets 417m+1 through 417n and thus associated kernel queues 416m+1 through 416n are used for use with transmitting data messages or packets of the queue 112 to the target system 120. Elements 403a-n denote communication paths between the WAN 101 and, respectively, the sockets 417a-n (and associated kernel queues 416a-b).

On the target system 120, sockets 427a-m and thus associated kernel queues 427a-m are reserved or dedicated for use with transmitting management messages or packets of the queue 124 to the source system 110. The sockets 427a-m and thus associated kernel queues 417a-m are reserved or dedicated for use with transmitting responses or replies to the management messages or packets of the queue 114 on the source system 110 that are received at the sockets 427a-m. On the target system 120, sockets 427m+1 through 427n and thus associated kernel queues 426m+1 through 426n are used for use with transmitting data messages or packets of the queue 122 to the source system 110. Elements 405a-n denote communication paths between the WAN 101 and, respectively, the sockets 427a-n (and associated kernel queues 426a-b).

Additionally, it should be noted that in the arrangement of FIGS. 4 and 5, both source and target systems reserve or dedicate the same number of M sockets, and thus M streams, for use with management message and response transmissions.

Reference is again made to FIG. 5 in an embodiment in which there are M reserved sockets on each of the source and target systems and where M>1. In such an embodiment, a management message from user space queue 114 may be placed on a first of the M kernel queues and then transmitted to the target system through the particular socket associated with the first kernel queue. For example, management messages from kernel queue M 416m are transmitted from the socket 416m to WAN 101 over 403m, and then from WAN 101 over to any one of the sockets 427a-m. In a similar manner, data messages from queue 112 placed in one of the kernel queues 416m+1 to 416n may be sent from the source to the target system. Also in a similar manner, management messages from user space queue 124 placed in one of the kernel queues 426a-m may be sent from the target system to the source system, and data messages from queue 122 placed in one of the kernel queues 426m+1 to 426n may be sent from the target system to the source system.

In at least one embodiment, when a message is sent from a first socket of the source system 110 to a second socket of the target system 120, a reply or response message may be returned to the first socket from which the original message is sent.

As a variation, a response or reply to a received message may be sent to a different socket than the socket that originally sent the message. For example, when a management message is sent from a first reserved socket of the source system 110 to a second reserved socket of the target system, a reply or response message may be returned to any of the reserved sockets on the source system 110 reserved for handling management messages (e.g., response may be sent to any one of the M reserved sockets of the source system). Also, when a data message is sent from one of the sockets 416m+1 through 416n of the source system 110 to any of the sockets 426m+1 through 426n of the target system, a reply or response message may be returned to any of the sockets 416m+1 through 416n on the source system 110 handling data messages (e.g., response may be sent to any one of the sockets of the source system handling only data messages). In such an embodiment in which a response or reply to a received message may be sent to a different socket than the socket that originally sent the message, code executing at a higher level in the call stack or chain, such as an application, may perform processing to select a particular socket to send a reply or response message to. Such selection may be based on any suitable technique such as using a round robin technique. For example, the source system may send a management message from a first of its reserved sockets to a second reserved socket of the target system. The target system may select one of the source systems reserved sockets to send a response or reply to acknowledging the management message. The target system may rotate in a round robin manner among the different reserved sockets of the source system in sending replies to different management messages. As a variation the target system may use a different load balancing technique to select from among the different reserved sockets of the source system to send a response or reply to a management message. For example, the target set may make a random selection from among the reserved sockets of the source system.

In at least one embodiment, the N sockets may be included in a single established TCP connection. More generally, the N sockets may be included in one or more established TCP connections.

Figure 6:
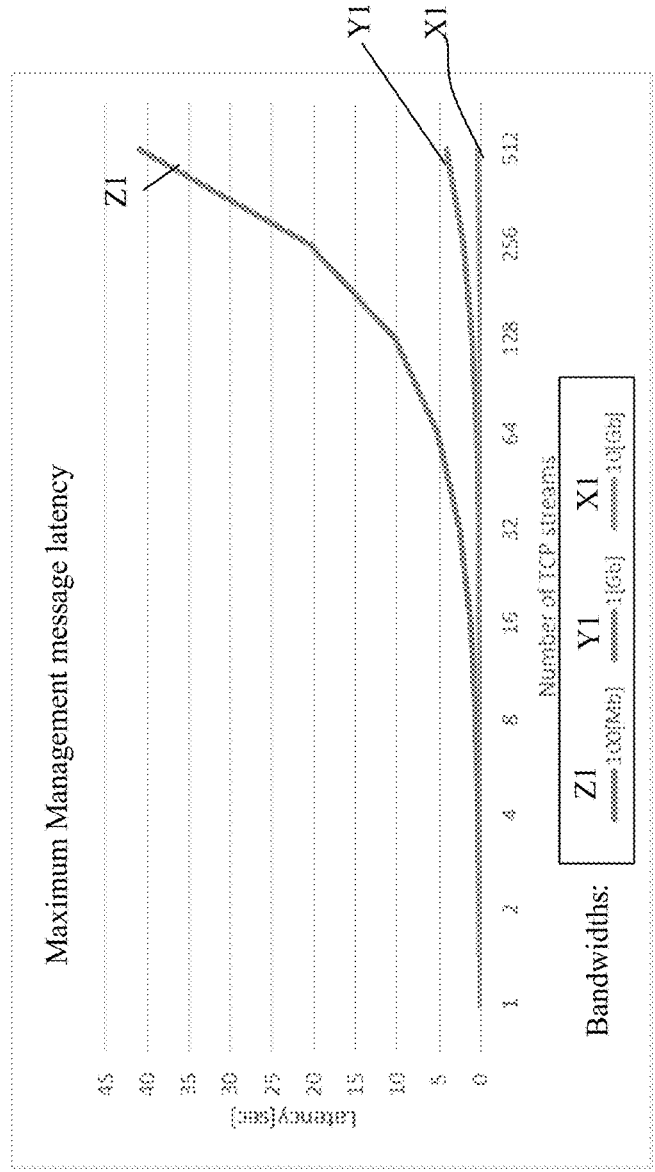
FIGS. 6 and 7 are graphical illustrations of latency times for different number of TCP streams used with management messages.

Referring to FIG. 6, shown is a graphical illustration 700 of the latency values estimated by the inventors such consistent with EQUATIONS 2 and 3 in connection with varying the total number of TCP streams but without having any dedicated or reserved management streams. For example, the FIG. 6 illustrates expected worst case latencies in connection with a total number of N streams, N>1 as in connection with FIGS. 2 and 3 not in accordance with the techniques herein. Thus, the EQUATIONS 2 and 3 are used in connection with calculating latencies used as the worst case latencies represented in FIG. 6.

In the FIG. 6, the X axis denotes different values for N, the total number of TCP streams, and the Y axis denotes the latency values in seconds. Additionally, the example 700 includes 3 different curves or lines for different bandwidths associated with the N TCP streams on the X axis. Line X1 denotes latency values for a 10 GB/second bandwidth. Line Y1 denotes latency values for a 1 GB/second bandwidth. Line Z1 denotes latency values for a 100 Mb/second (megabits/second) bandwidth.

Figure 7:
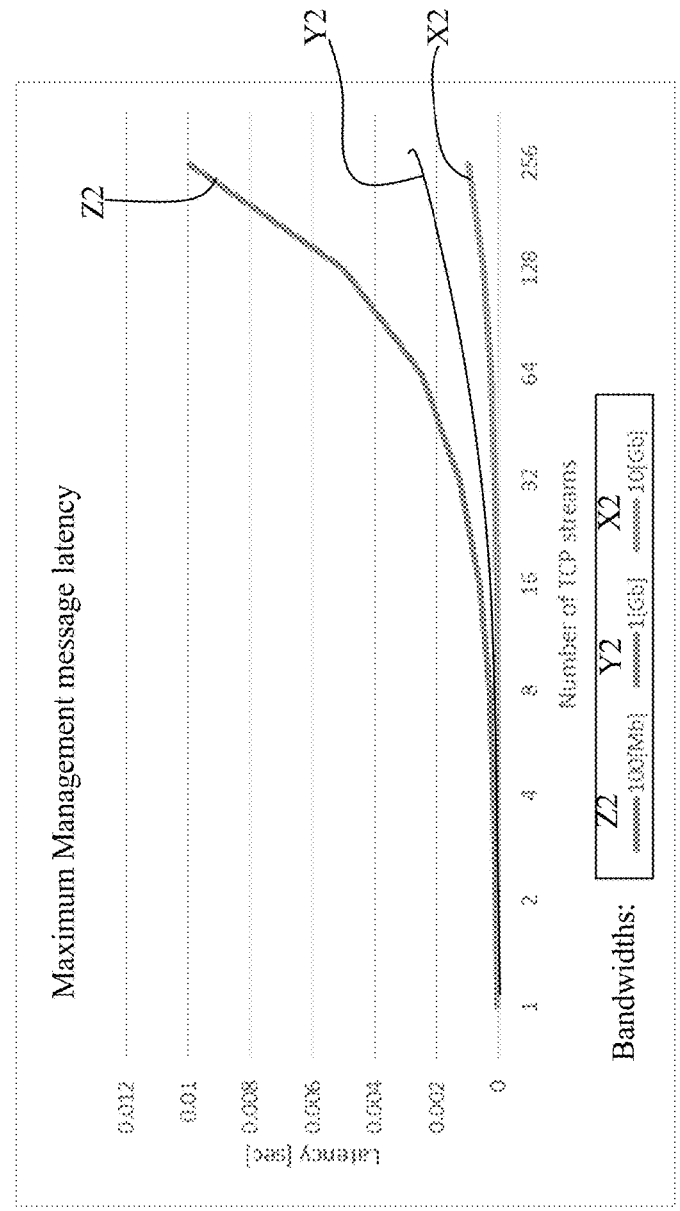

Referring to FIG. 7, shown is a graphical illustration 800 of the latency values estimated by the inventors such as using EQUATION 6 in connection with varying M, the total number of TCP streams dedicated or reserved management streams. For example, the FIG. 7 illustrates expected worst case latencies in connection with a total number of reserved or dedicated M streams, M>1 as in connection with FIGS. 4 and 5 that are in accordance with the techniques herein.

In the FIG. 7, the X axis denotes different values for M, the total number of reserved or dedicated TCP streams, and the Y axis denotes the latency values in seconds. Additionally, the example 800 includes 3 different curves or lines for different bandwidths associated with the N TCP streams on the X axis. Line X1 denotes latency values for a 10 GB/second bandwidth. Line Y1 denotes latency values for a 1 GB/second bandwidth. Line Z1 denotes latency values for a 100 Mb/second (megabits/second) bandwidth.

As can be seen, the maximum or worst case latency expected for a management message greatly decreased in FIG. 7 as compared to FIG. 6 when using one or more dedicated or reserved TCP streams for management messages.

FIGS. 4 and 5 denote embodiments in which both the source and target systems support reservation of sockets and thus streams in connection with processing only management messages or packets. Furthermore, both source and target systems may reserve the same number M of sockets for use with such dedicated or reserved TCP streams for management messages and responses.

In an embodiment in accordance with the techniques herein such as illustrated in FIGS. 4 and 5, information regarding the particular sockets reserved on each of the source and target systems may be exchanged as part of the negotiation process or handshaking when establishing a TCP connection. For example, the source system may be the initiator of the TCP connection and may send first information identifying the particular one or more sockets of the source system reserved for management messages and replies. In a similar manner, the target system may send second information identifying the particular one or more sockets of the target system reserved for management messages and replies. Thus, in the negotiation process or handshaking to establish the TCP connection, the source system as the initiator may also identify the particular number M of sockets reserved for management messages and the target system may reserve the same number of M sockets for management messages. In at least one embodiment, a bit of a flag word exchanged as part of the handshaking may be associated with each socket and may be set to 1 to indicate if the associated socket is reserved for management message. Otherwise, the bit may be 0. Thus FIGS. 4 and 5 depict embodiments in which both the source and target systems support stream reservation and reserving M sockets for management messages.

As a variation, one of the source and target systems may support stream reservation and reserving M sockets (and associated kernel queues) for management messages and the other of the source and target systems may not. For example, the source system may be the initiator and may support stream reservation and reserve M sockets (and associated kernel queues) for processing only management messages. However, the target system may not support stream reservation. Such a scenario is represented in the example 500 of FIG. 8 and the example 600 of FIG. 9. In such a case, there will be a partial improvement in latency experienced by the management messages transmitted by the source system as the initiator.

Figure 8:
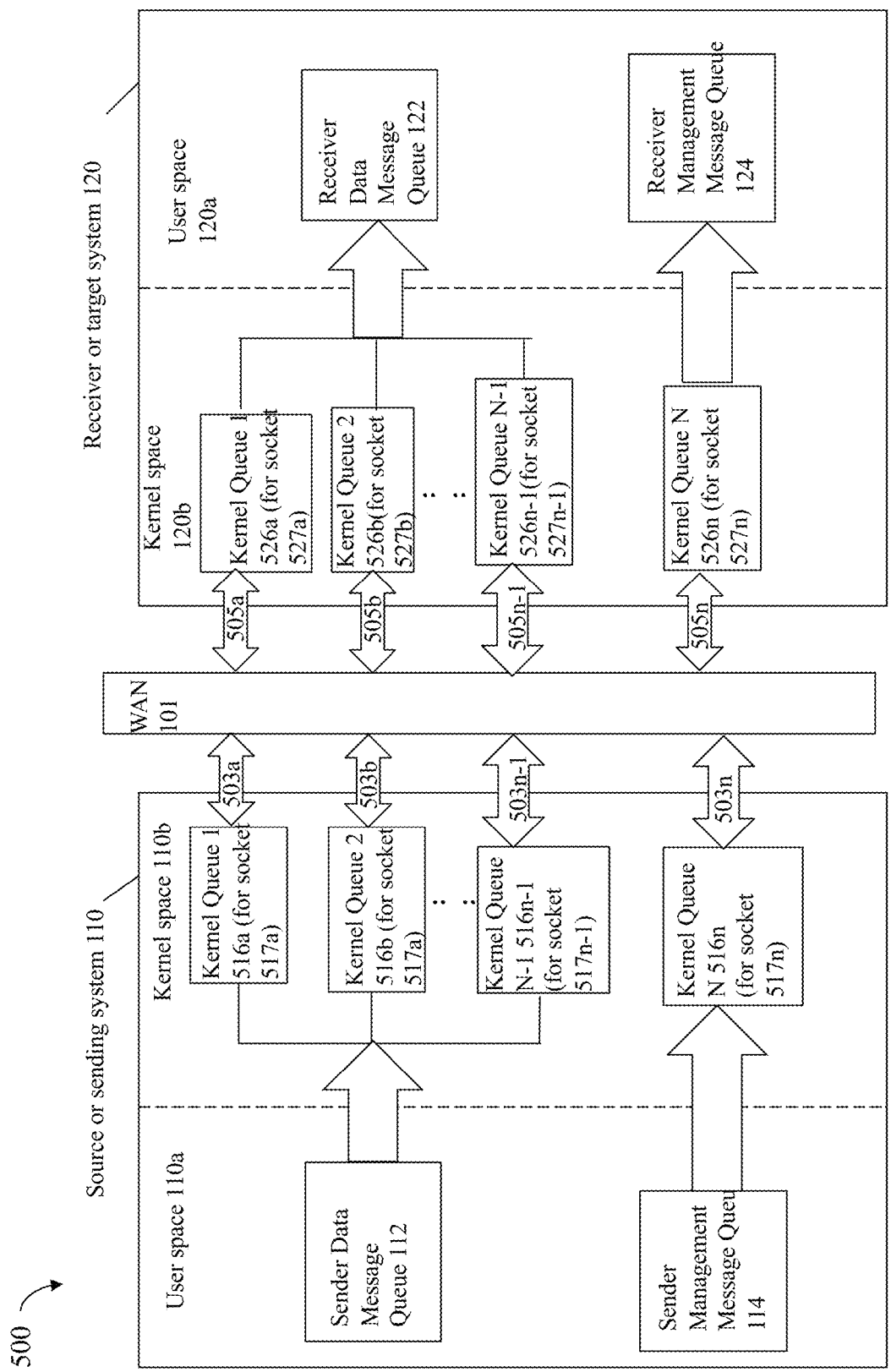

Referring to FIG. 8, shown is an example 500 of an embodiment in accordance with the techniques herein where the source system 100 as the initiator supports stream reservation for a single management stream but the target system 120 does not. In the example 500, the source system 110 reserves a single socket 517*n* for use in transmitting management messages. The remainder of the sockets 517*a*-*n*-1 may be used for transmitting data messages. Thus, the source system 110 of FIG. 8 is configured similar to the source system 110 of FIG. 4 and may operate as described above in connection with the source system 110 of FIG. 4 with the difference that the source system management sockets may send management messages as well as data messages to any socket 527*a*-*n* of the target system. The target system 120 may be configured similar to the target system 120 of FIG. 3 and may operate as described above in connection with the target system 120 of FIG. 3. In at least one embodiment, the target system 120 of FIG. 8 may return a responses to a management message to any of the sockets 517*a*-*n* of the source system or may return such response to the particular socket of the source system that sent the management message.

Figure 9:
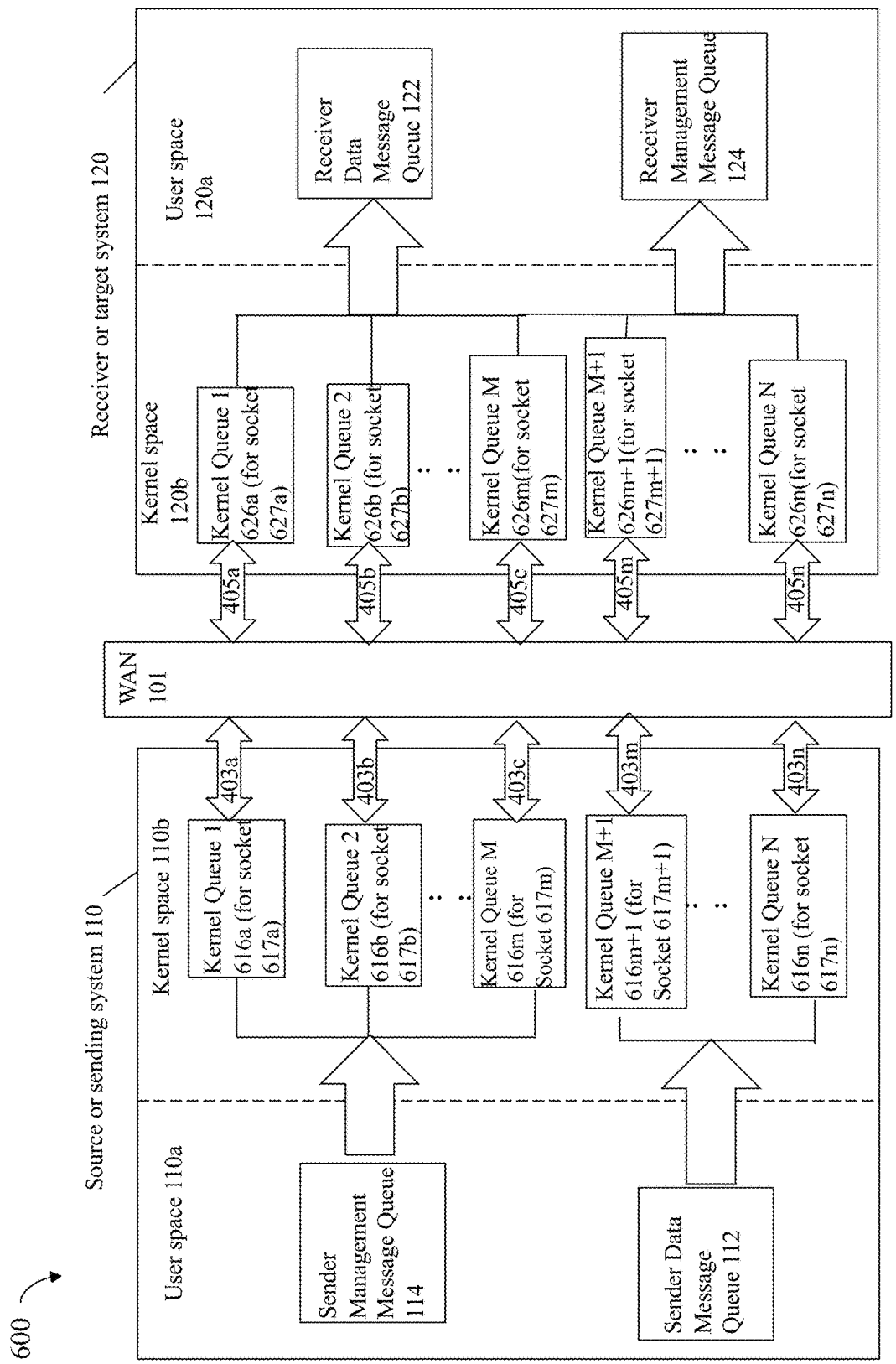

Referring to FIG. 9, shown is an example 600 of an embodiment in accordance with the techniques herein where the source system 100 as the initiator supports stream reservation for a single management stream but the target system 120 does not. In the example 600, the source system 110 reserves M sockets 617*a*-*m* for use in transmitting management messages. The remainder of the sockets 617*m*+1 through 617*n* may be used for transmitting data messages. Thus, the source system 110 of FIG. 9 is configured similar to the source system 110 of FIG. 5 and may operate as described above in connection with the source system 110 of FIG. 5. However, the target system 120 may be configured similar to the target system 120 of FIG. 3 and may operate as described above in connection with the target system 120 of FIG. 3 with the difference that the source system management sockets may send management messages as well as data messages to any socket 627*a*-*n* of the target system. In at least one embodiment, the target system 120 of FIG. 9 may return a response to a management message to any of the sockets 617*a*-*n* of the source system or may return such response to the particular socket of the source system that sent the management message.

It should be noted that in embodiments described above, the source system 110 may be the initiator of a TCP connection in accordance with the techniques herein. However, more generally, the target system 120 may also be the initiator of a TCP connection in accordance with the techniques herein. Additionally, although examples above are described with messages transmitted from the source system 110 to the target system 120 whereby the target system responds or replies to such messages from the source system, messages may also be transmitted from the target to the source system whereby the source system may respond o reply to such messages. In an embodiment in which messages are sent both from source to target system and from target to source system, reduced latency may be experienced when sending management messages from both the source and target systems configured such as described in connection with FIGS. 4 and 5 where both system support stream reservation and reserving sockets for management messages.

M denoting the number of reserved streams, as well as the number of reserved sockets and associated kernel queues within a system, reserved for management messages or packets may be selected in accordance with any suitable technique. For example, in at least one embodiment, a single management message may be less than the data packet size. Furthermore, as described herein, the management message size may be significantly less than the data packet size whereby the management message size or packet size is 1 KB for example, and the, data packet size is 1 MB, for example. In at least one embodiment, M may be selected so that no more than a single management message is ever pending or in progress in a single reserved kernel queue for management messages and there is no management message ever waiting to be processed in an outgoing kernel queue. In such an embodiment, M may be selected as the maximum number of management messages or packets expected to be pending, in progress or otherwise overlap.

Figure 10:
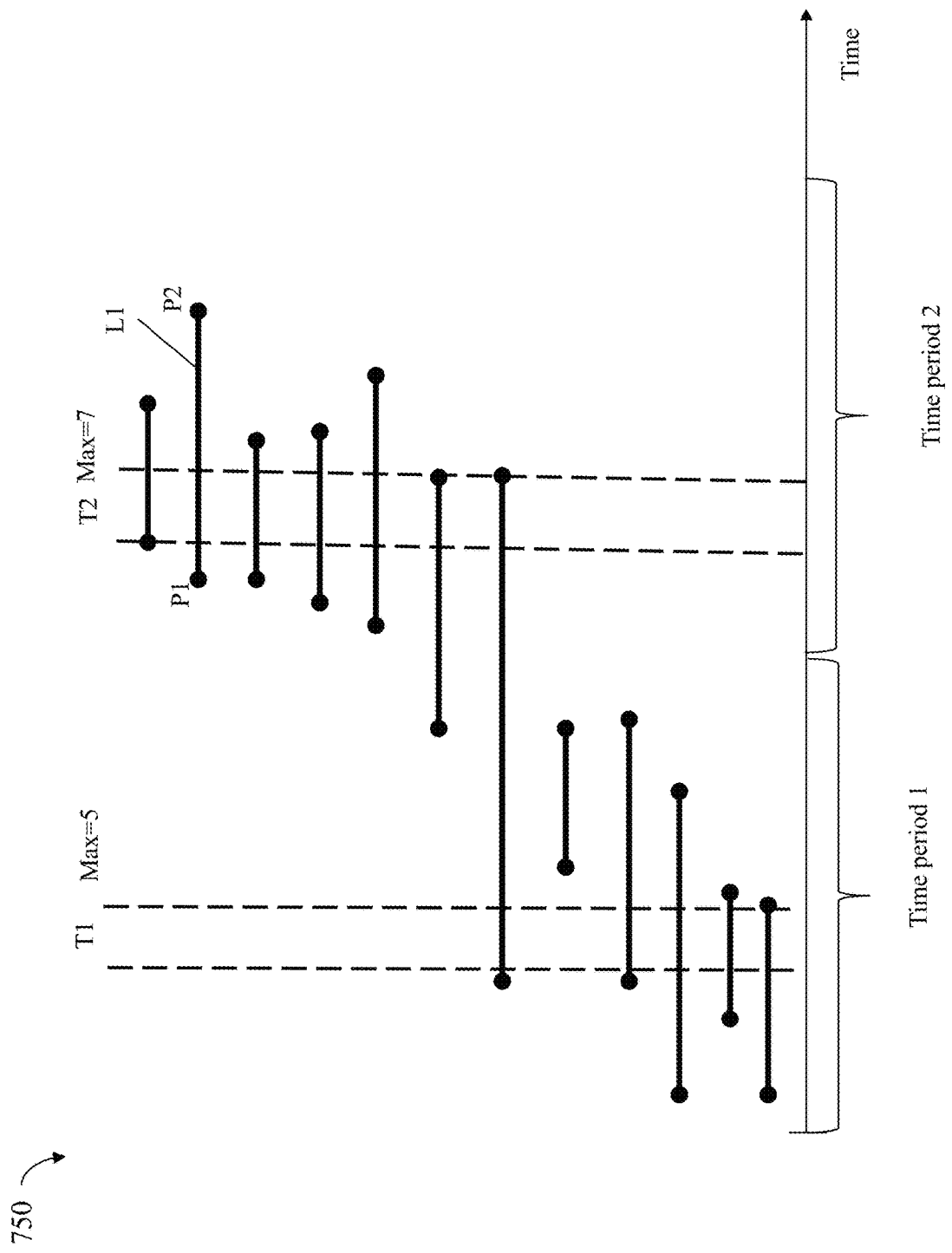
FIG. 10 is an example illustrating simultaneously overlapping or pending management requests in connection with selection of a value for M, the number of reserved streams and associated socket ports in an embodiment in accordance with the techniques herein.

For example, reference is made to FIG. 10 illustrating an observed management message pattern for two time periods in connection with management messages sent from the source system to the target system. In the example 750, the arrow denotes increasing time. Each of the horizontal lines denotes a time for a management message of a source system sent to the target system. Each horizontal line denotes a different management message and denotes the point in time from when the management message is initially placed in one of the kernel queues to when a response is received from the target system acknowledging the management message. For example, the line L1 has a starting time P1 denoting the time when the management message is initially placed in one of the kernel queues and an ending time P2 denoting the time when a response is received from the target system acknowledging the management message represented by L1.

In the example 750, time period 1 is a first time period during which a first maximum number of simultaneously pending management messages is observed within the time interval T1. During the continuous time interval T1, the maximum number of management messages simultaneously pending is 5 with respect to the time period 1. Time period 2 is a second time period during which a maximum number of simultaneously pending management messages is observed within the time interval T2. During the continuous time interval T2, the maximum number of management messages simultaneously pending is 7 with respect to the time period 2. Thus, the number of simultaneously pending management messages denotes a number of management messages that overlap in terms of time spanning from initial placement in a kernel queue on the source system and ending with the point in time when a reply or response from the target is received at the source system.

Thus, an embodiment with information observed as in FIG. 10 may select M=7. M may vary with application or use of the techniques herein. M may be selected based on a worst case or maximum expected number of simultaneously pending or overlapping management messages as in FIG. 10.

In at least one embodiment, M may be a configurable parameter. For example, M=7 may be initial or default value for M. In some embodiments, M may be modified, manually by a user or automatically in connection with dynamic modification and maintenance. For example, M may be decided and used by the source system (which may be the initiator) and conveyed to the target system. M may vary dynamically over time and may be dynamically reconfigured on both the source and target systems. M may be selected responsive to changes in detected behavior of the application or data storage system service sending the data and management messages.

For example, an initial value may be selected for M=7. M may be modified in a proactive manner based on a historical detected pattern. For example, behavior regarding the number of simultaneously pending management messages may be observed over time and a pattern of different maximum values for M may determined for different time periods. For example, during work hours Monday through Friday, a maximum value of M=7 may be used based on maximum number of pending management messages observed during such times. During other hours in the evening hours and on weekends, a maximum value of M=2 may be used based on maximum number of pending management messages observed historically during such times. In this manner, a pattern of values for M may be established and used to proactively select different values for M at different times.

M may be modified on the source system in a reactive manner. M may be modified at various points time in response to detected conditions in the source or sending system. For example, M may have a current value of 5. Processing may monitor the maximum number of pending management messages on the source system and may observe that one of the reserved sockets and associated kernel queue has up to 2 management messages pending. Response to detecting this, M may be increased from 5 to 7 and operate at M=7 for a first specified amount of time. During the first specified amount of time, processing may observe that all kernel queues are utilized and that there is never any management message in any kernel queue other than a single pending message for which the source system is awaiting a response from the target system. At a later point in time, processing may observe that no management message has been placed in 1 of the 7 kernel queues for at least a threshold amount of time (e.g., 1 of the kernel queues associated with one of the reserved sockets has been idle). As a result, M may be decreased from 7 to 6 responsive to the detected decrease in simultaneously pending management messages denoted by the idle reserved kernel queue and associated reserved socket.

The particular sockets reserved as well as the value for M, the number of sockets reserved, for management messages may be performed responsive to a failure of one or more of the identified reserved sockets on a system. For example, assume M=1 and the designated source system's reserved socket becomes unavailable. Responsive to detection of such an error condition or state, the source system may select another one of its remaining sockets as reserved for use with only management messages and transmit this reservation selection to the target system.

Resetting or reconfiguring M may be performed using any suitable technique. For example, the source system 110 (as initiator) may send a special management message to the target system 120 denoting the updated value of M and identifying the particular sockets of the source system reserved for management messages. In response, the target system may send a reply message to the source system identifying the particular sockets of the source system reserved for management messages based on the new updated value of M. As another example, the source system may close the TCP port and associated reserved streams based on a current value of M and then re-establish a TCP port with N streams using an updated value for M denoting the reserved streams and associated sockets. The handshake and negotiation may be repeated as described elsewhere herein between the source and target systems using the updated value for M.

It should be noted that the particular management and data messages transmitted between source and target systems may vary with embodiment, application and use of the techniques herein. For example, as noted above, the techniques described herein may be used in connection with replication between data storage systems such as in FIG. 2. In such an embodiment, the management messages may include commands to facilitate the data replication service. For example, with reference back to FIG. 2, a management message may be sent from the source system 52 to the target system 54 to initially create the LUN A"56b. As another example, the source system 52 may periodically send a message to the target system 54 to ensure that the target system is operational. In this latter case, the message may also be known and referred to as a keep alive message. If the target system does not respond within a specified maximum amount of time, the source system may conclude that the target system is down or otherwise unavailable.

It should be noted that examples in connection with the techniques herein, such as in FIGS. 4, 5, 8 and 9 have a same number N of total sockets on both the source and target systems.

In connection with discussion above, such as in connection with FIGS. 4, 5, 8 and 9, M reserved sockets and associated kernel queues are used for only processing management messages and not for non-management messages. The remaining sockets and associated queues that are not reserved (e.g., sockets and kernel queues M+1 through N) may be used to process data messages or more generally non-management messages only.

Figure 11:
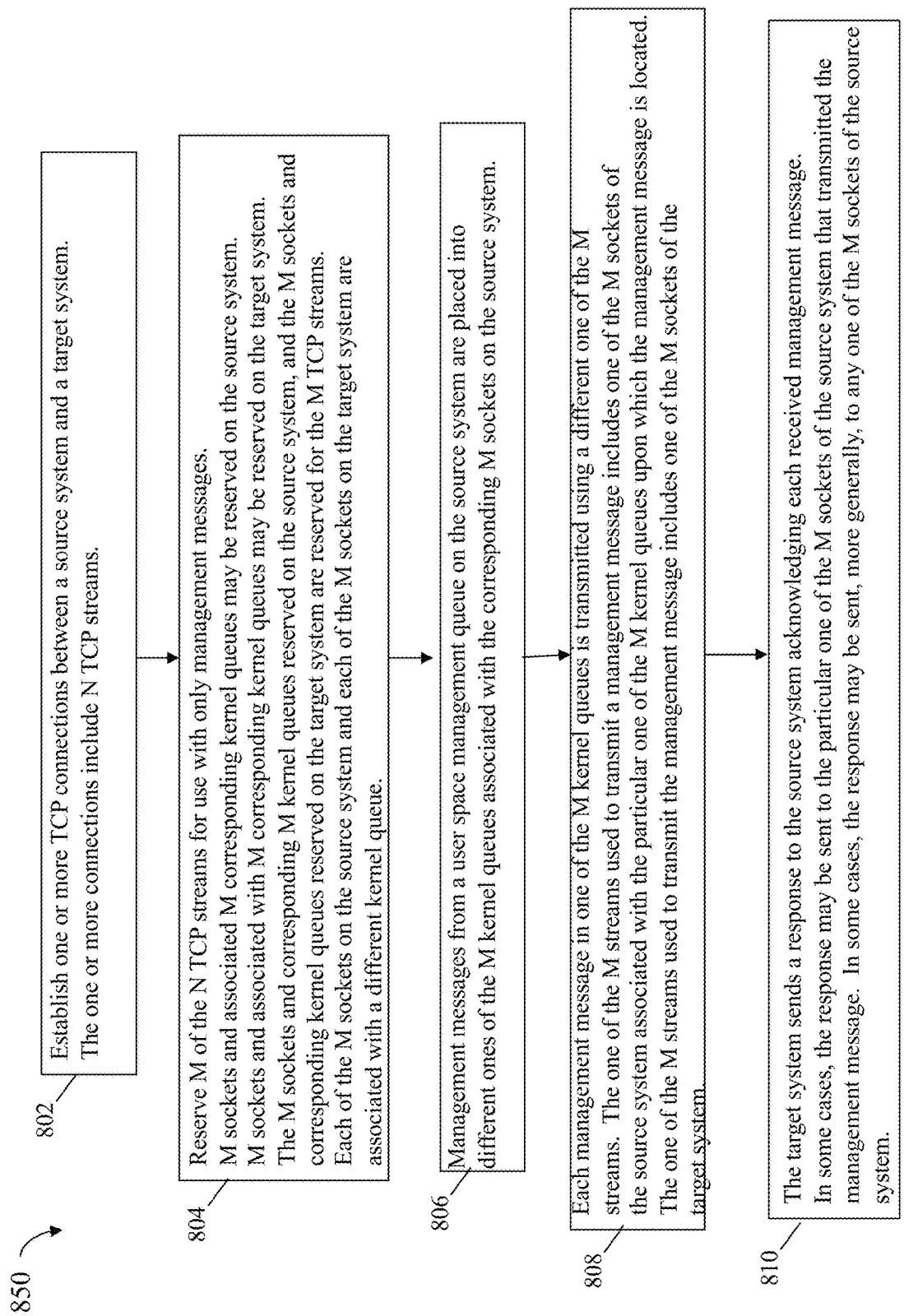
FIG. 11 is a flowchart of processing steps that may be performed in an embodiment in accordance with the techniques herein.

Referring to FIG. 11, shown is a flowchart of processing steps that may be performed in an embodiment in accordance with the techniques herein. The flowchart 850 generally summarizes processing described above.

At the step 802, one or more TCP connections are established between a source and target system. The one or more TCP connections include N TCP streams. From the step 802 control proceeds to the step 804. At the step 804, M of the N streams are reserved for only management messages. The step 804 may include reserving M sockets and associated M corresponding kernel queues on the source system. The step 804 may include reserving M sockets and associated with M corresponding kernel queues on the target system. The M sockets and corresponding M kernel queues reserved on the source system, and the M sockets and corresponding kernel queues reserved on the target system are reserved for the M TCP streams. Each of the M sockets on the source system and each of the M sockets on the target system are associated with a different kernel queue. From the step 804, control proceeds to the step 806.

At the step 806, management messages from a user space management queue on the source system are placed into different ones of the M kernel queues associated with the corresponding M sockets of the source system. From the step 806, control proceeds to the step 808. In the step 808, Each management message in one of the M kernel queues is transmitted using a different one of the M streams. The one of the M streams used to transmit a management message includes one of the M sockets of the source system associated with the particular one of the M kernel queues upon which the management message is located. The one of the M streams used to transmit the management message includes one of the M sockets of the target system. From the step 806, control proceeds to the step 808. At the step 808, the target system sends a response to the source system acknowledging each received management message. In some cases, the response may be sent to the particular one of the M sockets of the source system that transmitted the management message. In some cases, the response may be sent, more generally, to any one of the M sockets of the source system.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing messages comprising:
   establishing a plurality of streams between a source system and a target system; and
   reserving M of the plurality of streams for use in transmitting only management messages, wherein M is at least two and wherein said reserving includes:
   reserving M sockets on the source system, wherein the M sockets on the source system are reserved for use only with management messages; and
   reserving M sockets on the target system, wherein the M sockets on the target system are reserved for use only with management messages, wherein each of the M sockets on the source system is associated with a different one of M kernel queues on the source system, and wherein the method further includes:
   placing each of a plurality of management messages from a management message queue in user space of the source system into a different one of the M kernel queues of the source system;
   transmitting each of the plurality of management messages in the different one of the M kernel queues from the source system to the target system over a different one of the M streams reserved for management messages, wherein the different one of the M streams includes a corresponding one of the M sockets of the source system associated with the different one of the M kernel queues of the source system, and wherein the different one of the M streams includes one of the M sockets reserved on the target system; and
   transmitting a first data message over a first of the plurality of streams, wherein the first stream is not included in the M streams reserved for use in transmitting only management messages and wherein the first stream is used in transmitting only non-management messages.

2. The method of claim 1, wherein the M streams reserved for use in transmitting only management messages includes a second stream, wherein the second stream includes a first socket of the M sockets reserved on the source system and a second socket of the M sockets reserved on the target system, and the method further comprises:
transmitting a first management message over the second stream from the source system to the target system, wherein the first management message is sent from the first socket reserved on the source system to the second socket reserved on the target system.

3. The method of claim 2, further comprising:
sending a response to the first management message from the target system to the source system.

4. The method of claim 3, wherein the response to first management message is sent to the first socket reserved on the source system that sent the first management message.

5. The method of claim 3, wherein the response to the first management message is sent to a third of the M sockets on the source system, wherein the first socket reserved on the source system reserved is different from the third socket reserved on the source system.

6. The method of claim 2, wherein the source system is a source data storage system and the target system is a target data storage system.

7. The method of claim 6, wherein the first management message and the first data message are transmitted from the source data storage system to the target data storage system in connection with performing a replication storage service on the source data storage system.

8. The method of claim 7, wherein the first management message is sent over a control or management path including the first stream.

9. The method of claim 8, wherein the first data message is sent over a data or I/O path including the second stream.

10. The method of claim 1, wherein the plurality of streams are over a wide area network.

11. The method of claim 1, wherein the plurality of streams are included in a same established connection in accordance with a transmission control protocol (TCP).

12. The method of claim 1, wherein said establishing further comprises:
sending first information from the source system to the target system identifying the M sockets of the source system reserved for processing only management messages; and
sending second information from the target system to the source system identifying the M sockets of the target system reserved for processing only management messages.

13. A system comprising:
one or more processors; and
a memory comprising code stored thereon that, when executed, performs a method of processing messages comprising:
establishing a plurality of streams between a source system and a target system; and
reserving M of the plurality of streams for use in transmitting only management messages, wherein M is at least two and wherein said reserving includes:
reserving M sockets on the source system, wherein the M sockets on the source system are reserved for use only with management messages; and
reserving M sockets on the target system, wherein the M sockets on the target system are reserved for use only with management messages, wherein each of the M sockets on the source system is associated with a different one of M kernel queues on the source system, and wherein the method further includes:
placing each of a plurality of management messages from a management message queue in user space of the source system into a different one of the M kernel queues of the source system;
transmitting each of the plurality of management messages in the different one of the M kernel queues from the source system to the target system over a different one of the M streams reserved for management messages, wherein the different one of the M streams includes a corresponding one of the M sockets of the source system associated with the different one of the M kernel queues of the source system, and wherein the different one of the M streams includes one of the M sockets reserved on the target system; and
transmitting a first data message over a first of the plurality of streams, wherein the first stream is not included in the M streams reserved for use in transmitting only management messages and wherein the first stream is used in transmitting only non-management messages.

14. A non-transitory computer readable medium comprising code stored thereon that, when executed, performs a method of processing messages comprising:
establishing a plurality of streams between a source system and a target system; and
reserving M of the plurality of streams for use in transmitting only management messages, wherein M is at least two and wherein said reserving includes:
reserving M sockets on the source system, wherein the M sockets on the source system are reserved for use only with management messages; and
reserving M sockets on the target system, wherein the M sockets on the target system are reserved for use only with management messages, wherein each of the M sockets on the source system is associated with a different one of M kernel queues on the source system, and wherein the method further includes:
placing each of a plurality of management messages from a management message queue in user space of the source system into a different one of the M kernel queues of the source system;
transmitting each of the plurality of management messages in the different one of the M kernel queues from the source system to the target system over a different one of the M streams reserved for management messages, wherein the different one of the M streams includes a corresponding one of the M sockets of the source system associated with the different one of the M kernel queues of the source system, and wherein the different one of the M streams includes one of the M sockets reserved on the target system; and
transmitting a first data message over a first of the plurality of streams, wherein the first stream is not included in the M streams reserved for use in transmitting only management messages and wherein the first stream is used in transmitting only non-management messages.

* * * * *